United States Patent

Mizuki et al.

[11] Patent Number: 5,979,971
[45] Date of Patent: Nov. 9, 1999

[54] DEVICE FOR HOLDING A VEHICLE SLIDING DOOR AT FULL-OPEN POSITION

[75] Inventors: Tetsuro Mizuki; Patrick Dowling, both of Yamanshi-ken; Yukihide Katoh; Kenji Kobashi, both of Aichi-ken, all of Japan

[73] Assignees: Mitsui Kinzoku Kogyo Kabushiki Kaisha, Tokyo; Toyota Jidosha Kabushiki Kaisha, Aichi, both of Japan

[21] Appl. No.: 08/803,673

[22] Filed: Feb. 21, 1997

[30] Foreign Application Priority Data

Feb. 23, 1996 [JP] Japan .................................. 8-061701

[51] Int. Cl.⁶ ...................................................... B60J 5/06
[52] U.S. Cl. ............................ 296/155; 49/213; 292/219; 292/229
[58] Field of Search ............................ 296/155; 49/213; 292/219, 229, 201, 216, 196

[56] References Cited

U.S. PATENT DOCUMENTS 4,502,246  3/1985  Minami ................................. 49/213 X
4,835,997  6/1989  Akright .
5,388,901  2/1995  Asano ................................. 292/219 X

FOREIGN PATENT DOCUMENTS 3407-070-A  8/1984  Germany ............................... 296/155
2-121571    3/1990  Japan .
1178671     1/1970  United Kingdom .

Primary Examiner—D. Glenn Dayoan
Assistant Examiner—Jason Morrow
Attorney, Agent, or Firm—Browdy and Neimark

[57] ABSTRACT

A device for holding a vehicle sliding door at full-open position comprises a striker fixed to a vehicle body and a latch rotatably mounted on the sliding door. The latch has a U-shaped groove for engaging with the striker when the sliding door is fully opened. The latch is displaceable between a first position in which the U-shaped groove is disengaged with the striker and second position in which the U-shaped groove is engaged with the striker. A resilient member is disposed at a location between the latch and the sliding door for holding the latch in either one of the first position and the second position by resilient force thereof. The resilient member is always in contact with the latch directly.

4 Claims, 6 Drawing Sheets

DEVICE FOR HOLDING A VEHICLE SLIDING DOOR AT FULL-OPEN POSITION

FIELD OF THE INVENTION

The present invention relates to a device for holding a vehicle sliding door, which is slidably attached to a vehicle body, and particularly relates to a device for holding a vehicle sliding door at full-open position.

DESCRIPTION OF THE PRIOR ART

A conventional vehicle sliding door has rollers which slidably engage with a guide rail attached to a side surface portion of a vehicle body, and moves substantially in parallel with the side surface of the vehicle between its full-open and full-close positions.

The above sliding doors include a device for holding a sliding door at the full-close position, and a device for holding a sliding door at the full-open position. The present invention relates to the latter holding device.

The latter holding device is comprised of a blade spring having a sufficient resiliency, which is disposed on an end portion of the guide rail. When the sliding door moves up to the full-open position, rollers of the sliding door deform the blade spring to climb over it, and then the sliding door is held at the full-open position by the resiliency of the blade spring.

In the holding device which employs a blade spring, a force required for holding the sliding door at the full-close position is proportion to a strength of the resiliency of the blade spring. However, a strong resiliency of the blade spring causes the rollers to be strongly rubbed with the blade spring, which disadvantageously accelerates abrasion of both the rollers and the blade spring. Moreover, the strong resiliency of the blade spring disadvantageously causes the sliding door to be shaky when the rollers climb over the blade spring.

FIGS. 1 and 2 show another type holding device which is described in Japanese Utility Model Laid Open (Kokai) No. 2-121571. In FIGS. 1 and 2, reference symbol A designates a guide rail, disposed on a vehicle body, with which a plurality of rollers B are slidably engaged. The rollers B are rotatably supported on a roller bracket C which is rotatably attached by a shaft E to a connecting bracket D fixed to the sliding door. A latch G with a U-shaped groove F and a ratchet H are pivotably mounted to the connecting bracket D. When the sliding door moves toward the full-open position, the latch G is rotated clockwise due to the engagement between the U-shaped groove F and a striker J fixed to the vehicle body. After that, a pawl portion K of the ratchet H engages with a step portion L of the latch G, thereby keeping the latch G and the striker L to be engaged with each other. The ratchet H is connected to an opening handle for the sliding door through a cable or rod M.

The holding device shown in FIGS. 1 and 2 exhibits an extremely high holding force since an engagement between the latch G and the striker J is held by the ratchet H, but has a disadvantage that unless the opening handle for the sliding door is operated, the latch G and the striker J cannot be disengaged. In other words, the sliding door cannot be closed even if a portion other than the opening handle of the sliding door is pushed toward the closed position, thereby deteriorating the usability.

SUMMARY OF THE INVENTION

It is, therefore, an object of the present invention to provide a device for holding a vehicle sliding door at full-open position, which resolves the above-mentioned conventional problems.

BRIEF DESCRIPTION OF THE DRAWINGS

The above and other objects, features and advantages of the present invention will become apparent from the detailed description of the preferred embodiments found below with reference to the accompanying drawings in which.

DESCRIPTION OF THE PREFERRED EMBODIMENTS

Figure 1:
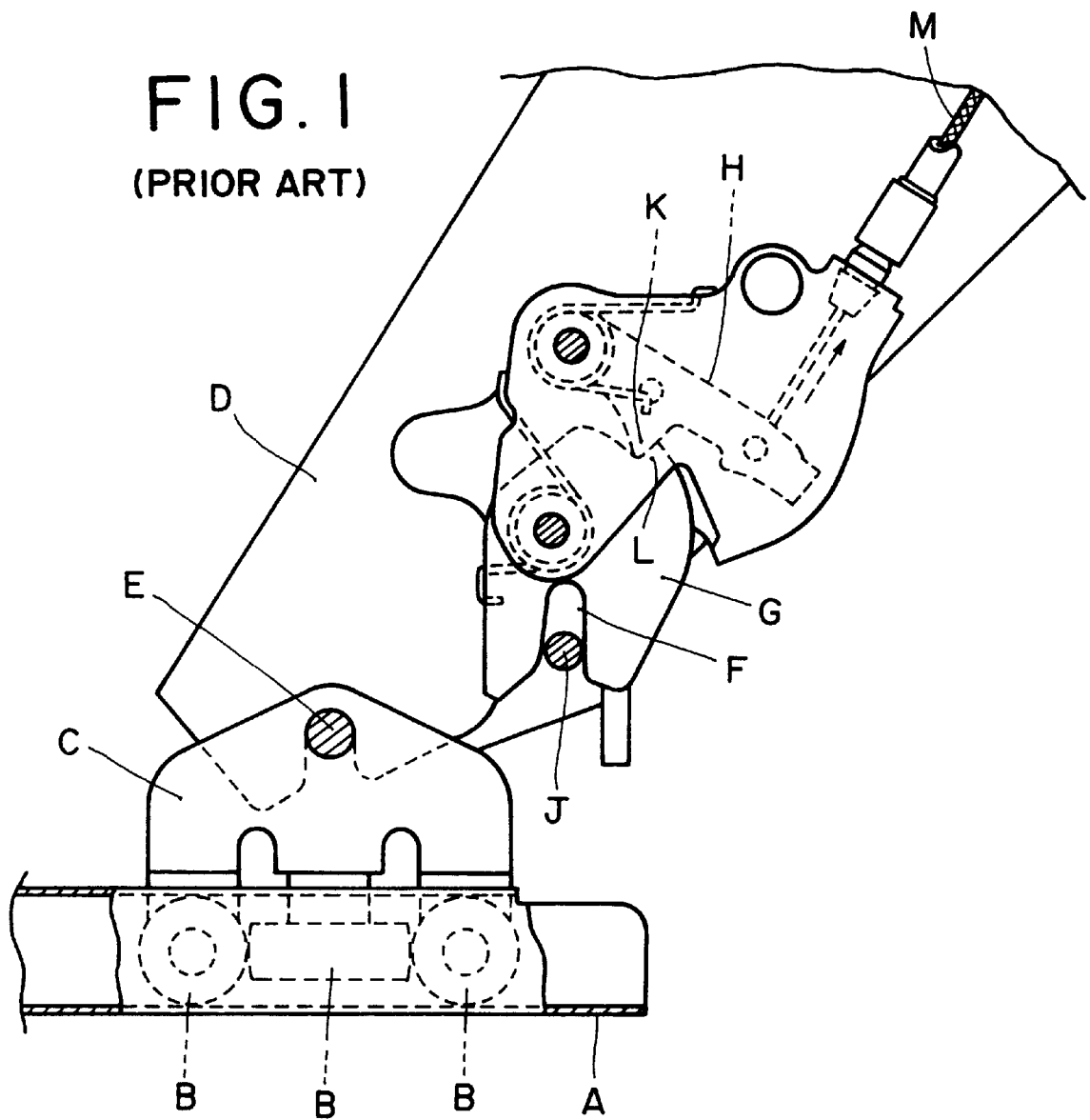
FIGS. 1 and 2 are plan views showing a conventional holding device.
Figure 2:
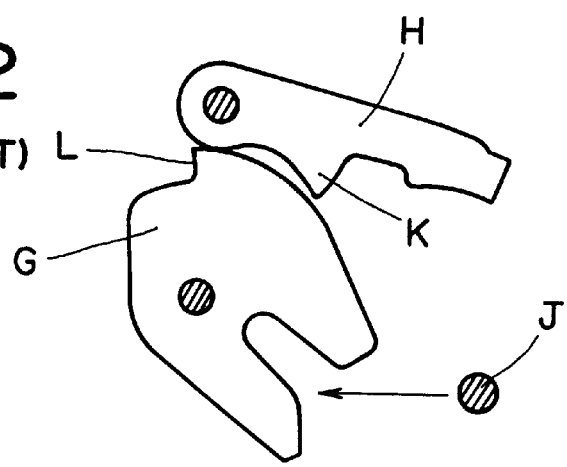
Figure 3:
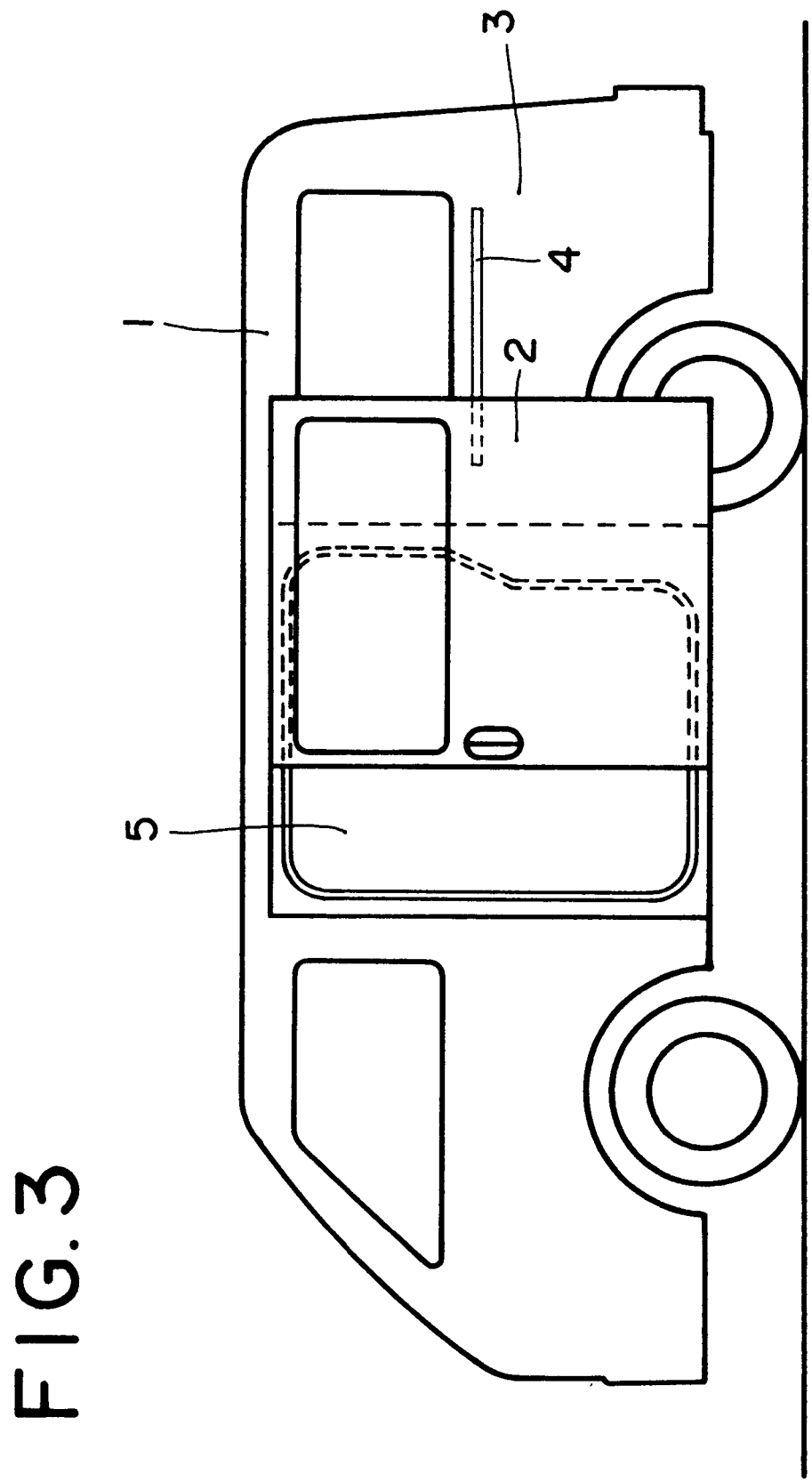
FIG. 3 is a side view showing a relation between a vehicle body and a sliding door of the present invention.

An embodiment of the present invention will be described hereinbelow with reference to the drawings. As shown in FIG. 3, a vehicle body 1 is comprised of a sliding door 2 which is slidably supported on a guide rail 4 fixed to a rear outer side panel 3 of the vehicle body 1. The sliding door 2 moves substantially in parallel with a side surface portion of the vehicle body 1 between a full-open position opposite the side panel 3 and a full-close position closing an entrance 5 of the vehicle body 1.

Figure 4:
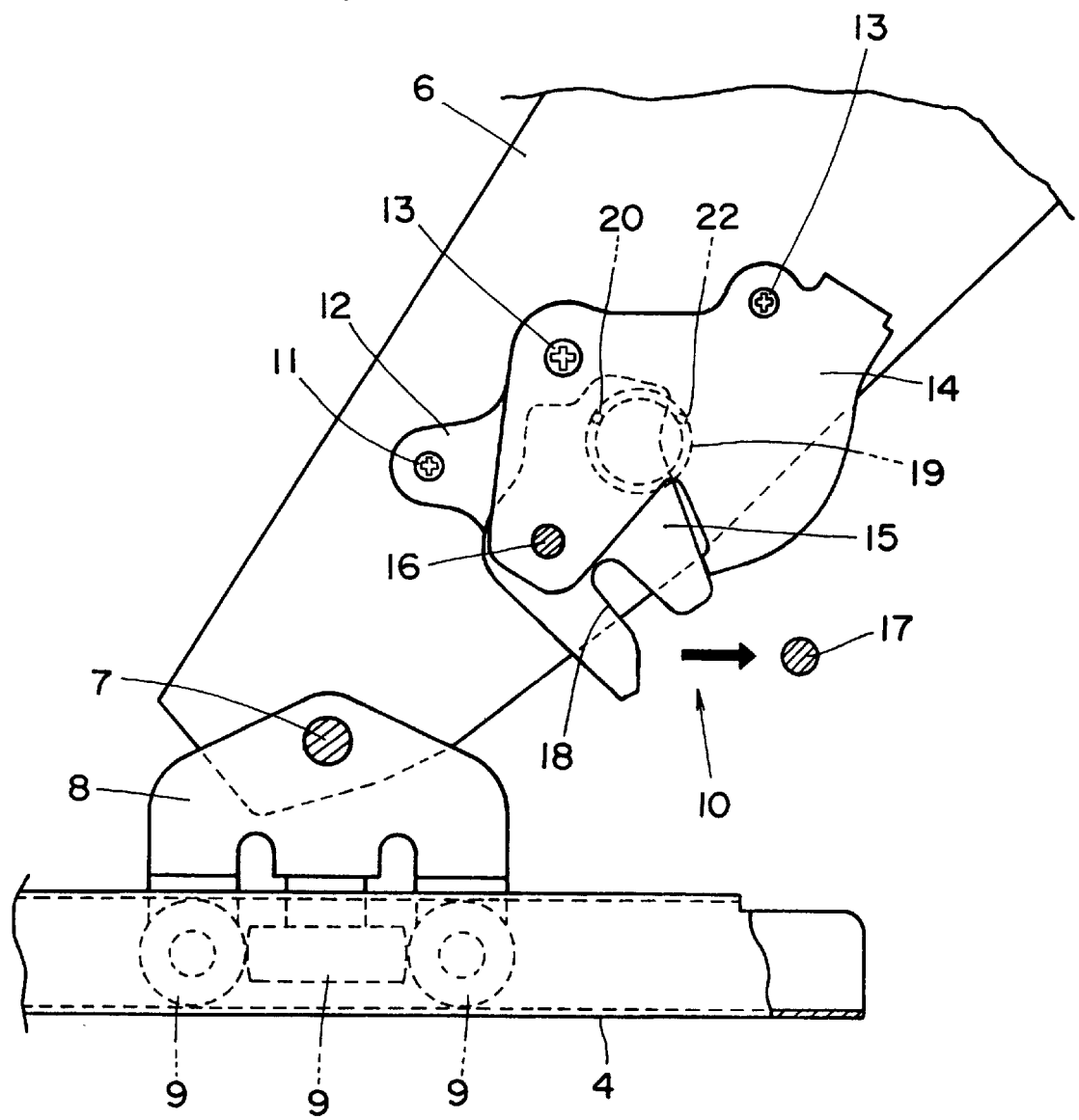
FIG. 4 is a plan view of a holding device according to an embodiment of the present invention, in a state in which a latch is at the disengaged position.
Figure 5:
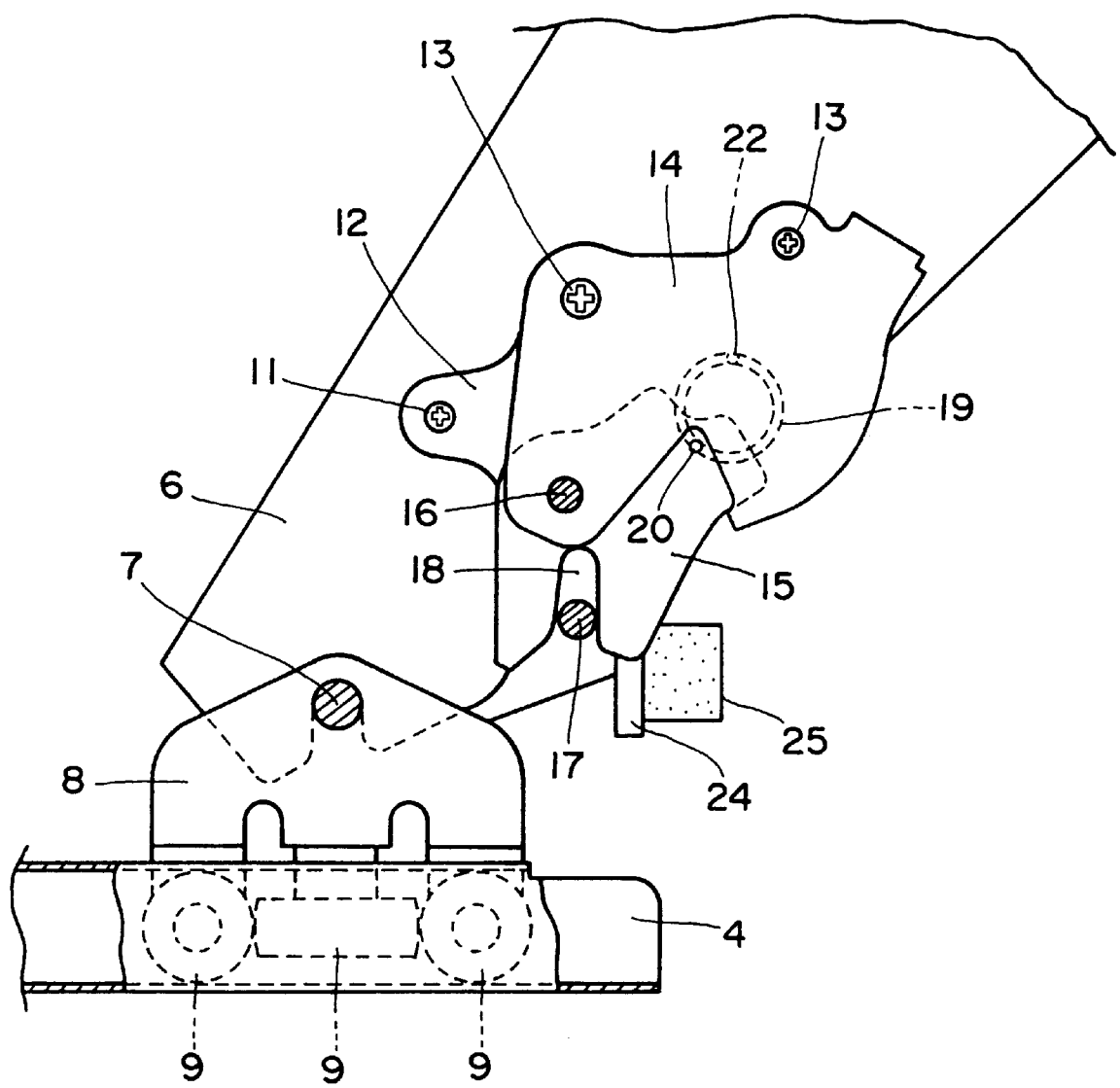
FIG. 5 is a plan view of a holding device according to the embodiment of the present invention, in a state in which the latch is at the engaged position.
Figure 6:
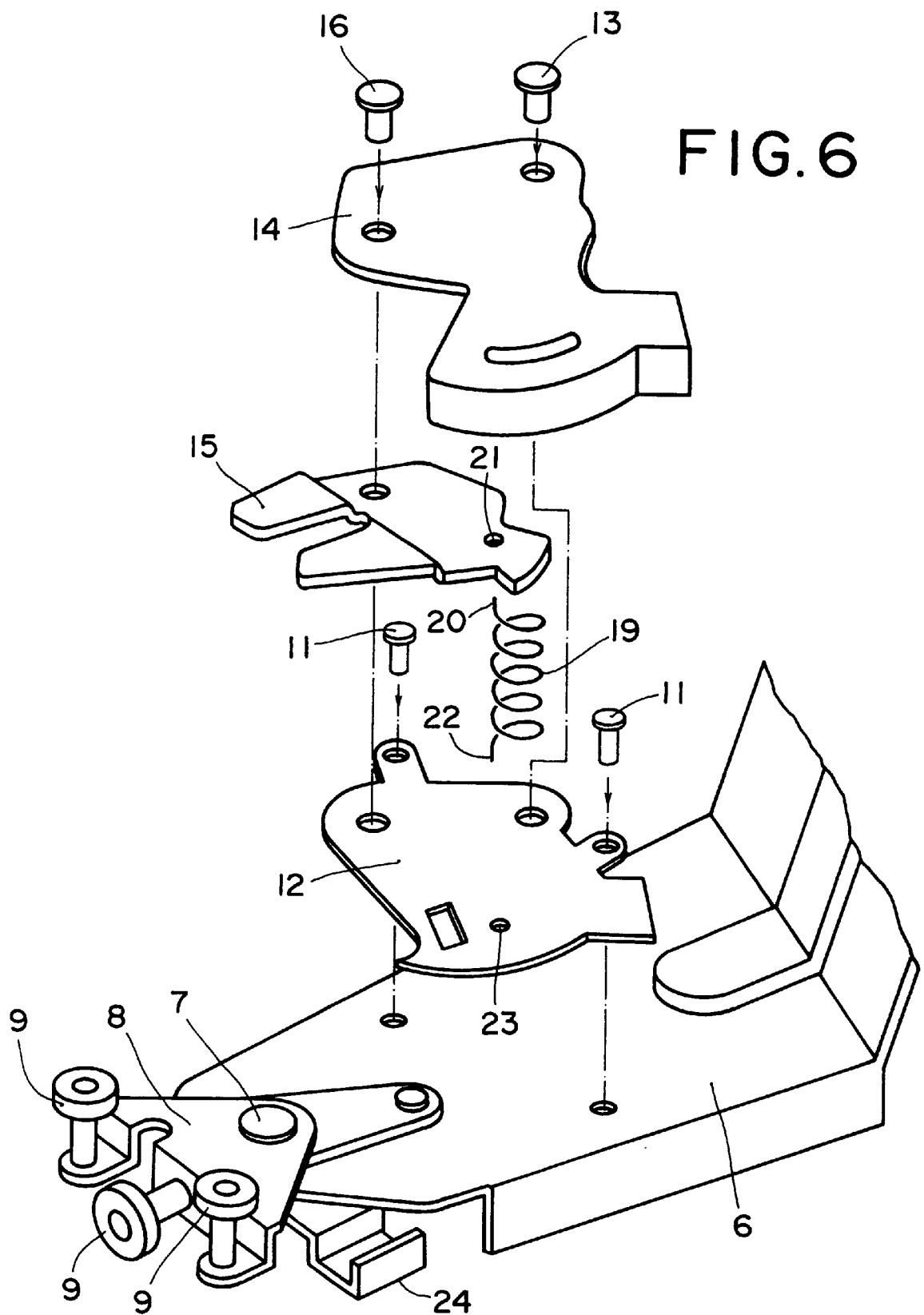
FIG. 6 is an exploded view of the holding device.

A connecting bracket 6 is, shown in FIGS. 4 to 6, fixed to the sliding door 2. A roller bracket 8 is rotatably attached to a leading end portion of the connecting bracket 6 by a shaft 7 and has a plurality of rollers 9 which is slidably engaged with the guide rail 4.

A holding device 10 for holding the sliding door 2 at the full-open position is provided on the connecting bracket 6. The holding device 10 includes a base plate 12 fixed to the bracket 6 by a fastener 11 such as a screw and a rivet, a cover plate 14 fixed to the base plate 12 through a fastener 13 such as a screw and a rivet, and a latch 15 disposed between the base plate 12 and the cover plate 14. The latch 15 is rotatably attached to the plates 12 and 14 through a shaft 16.

The holding device 10 has a coil spring 19 which is called the over center spring. An upper end portion or upward-bent leg 20 of the spring coil 19 is inserted into a small engaging hole 21 of the latch 15, and a lower end portion or downward-bent leg 22 is inserted into a small engaging hole 23 of the base plate 12. The coil spring 19 is compressed to the maximum when the upward-bent leg 20 is superposed on a straight line connecting the downward-bent leg 22 and the shaft 16 of the latch 15. Therefore, the latch 15 is held by the resiliency of the coil spring 19 at either one of a disengaged position shown in FIG. 4 and an engaged position shown in FIG. 5 with respect to the straight line, i.e. the dead-center position.

The latch 15 has a U-shaped groove 18 with which a striker 17 fixed to the vehicle body 1 is engageable. When the sliding door 2 moves toward the full-open position and the striker 17 is engaged with the U-like groove 18. The latch 15 is once held at the disengaged position shown in FIG. 4 by the resiliency of the coil spring 19, it until is rotated over the dead-center point against the resiliency of the coil spring 19, thereby being displaced to the engaged position shown in FIG. 5. In a state shown in FIG. 5, the latch 15 is held at the engaged position by the resiliency of the coil spring 19, and therefore the sliding door 2 is held at the full-open position. When the sliding door 2 moves up to the full-open position, an abutting portion 24 of the connecting bracket 6 is abutted to a stopper 25 fixed to the vehicle 1.

According to the above-mentioned construction, the sliding door 2 is prevented from being rickety when movement of the sliding door 2 since the resilient force of the coil spring 19 for holding the sliding door 2 at the full-open position merely acts as an rotational resistance of the latch 15, and further the roller 9 is hardly abraded compared with that of the device using the conventional blade spring since the roller 9 is not slidably connected to the spring 19. Furthermore, the holding force of the holding device 10 can be easily raised by increasing the resilient force of the coil spring 19 since there is no fear that the roller 9 will be abraded.

When the sliding door 2 will be closed, the latch 5 is merely held by the resiliency of the coil spring 19, and therefore if an external force is applied to a desired portion of the sliding door 2 in the door closing direction, the latch 15 is rotated in the disengaging direction, whereby the sliding door 2 is slid to the door closing direction.

Figure 7:
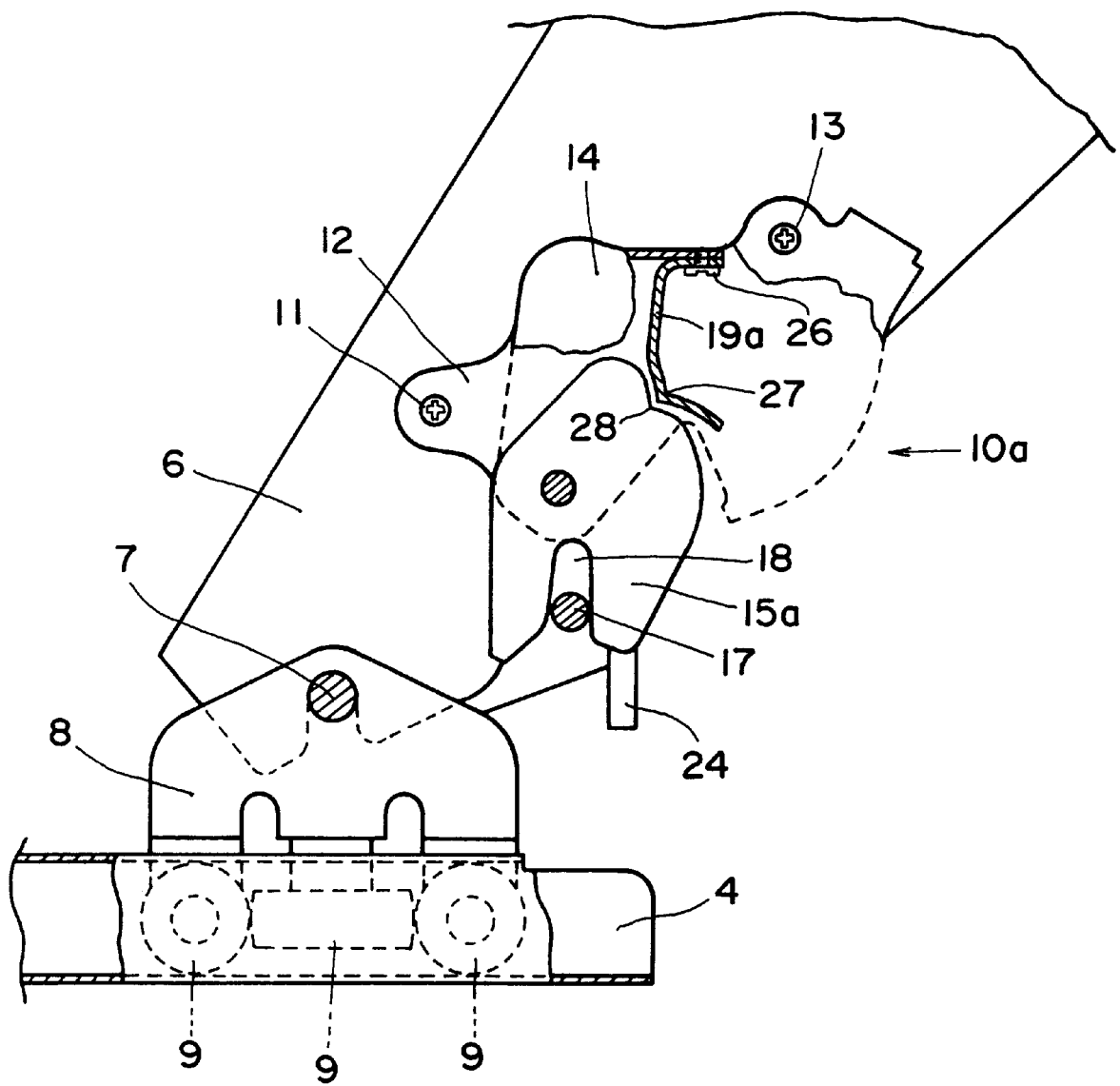
FIG. 7 is a plan view of a holding device according to another embodiment of the present invention.

There is shown in FIG. 7 another embodiment of the present invention which uses a blade spring 19a instead of the coil spring 19. The blade spring 19a is fixed to the cover case 14 at one end thereof by a fastener 26. The blade spring 19a is formed with a bent portion 27 at the other end thereof, and the bent portion 27 engages with a recess portion 28 of the latch 15a when the latch 15a is at the engaged position, thereby holding the latch 15a at the engaged position.

In the above description, two kinds of springs are exemplified as a resilient member for holding the latch at the engaged position, any other resilient members of various kinds may be employed.

The foregoing discussion discloses and describes merely exemplary embodiment of the present invention only. One skilled in the art will readily recognize from such discussion, and from the accompanying drawings and claims, that various changes, modifications and variations can be made therein without departing from the spirit and scope of the invention as defined in the following claims.

What is claimed is:

1. A device for holding a vehicle sliding door at full-open position, comprising:

a striker fixed to a vehicle body;

a latch rotatably mounted on the sliding door, said latch having a U-shaped groove for engaging with the striker when the sliding door is fully opened, said latch having a first position in which the U-shaped groove is disengaged with the striker and second position in which the U-shaped groove is engaged with the striker; and resilient means disposed at a location between the latch and the sliding door for holding the latch in both the first position and the second position with respect to a dead center position thereof by resilient force thereof, said resilient means being always in contact with the latch directly;

wherein said resilient means comprises a blade spring having a bent portion, and said latch is formed at its outer periphery with a recess in which the bent portion is resiliently engaged when the latch is in the second position.

2. A device on a vehicle body which holds a vehicle sliding door at full-open position, comprising:

a striker fixed to the vehicle body;

a latch rotatably mounted on the sliding door, said latch having a U-shaped groove for engaging with the striker when the sliding door is fully opened, said latch having a first position in which the U-shaped groove is disengaged with the striker and second position in which the U-shaped groove is engaged with the striker; and resilient means disposed at a location between the latch and the sliding door for holding the latch in both the first position and the second position with respect to a dead-center position thereof by a resilient force thereof, said resilient means being always in contact with the latch directly;

wherein the vehicle sliding door can be disengaged from the striker and from the full-open position, without operating a door-opening handle, by only pushing on any part of the vehicle sliding door toward a closed position.

3. A device on a vehicle body which holds a vehicle sliding door at full-open position according to claim 2, wherein said resilient means comprises a coil spring having an upward-bent leg and a downward-bent leg, said upward-bent leg being engaged to the latch, and said downward-bent leg being engaged to the sliding door.

4. A device on a vehicle body which holds a vehicle sliding door at full-open position according to claim 2, wherein said resilient means comprises a blade spring having a bent portion, and said latch being formed at an outer periphery thereof with a recess in which the bent portion is resiliently engaged when the latch is in the second position.

* * * * *